United States Patent
Koshar

(10) Patent No.: US 11,725,453 B2
(45) Date of Patent: Aug. 15, 2023

(54) PEST BARRICADE

(71) Applicant: John Koshar, Tumacacori, AZ (US)

(72) Inventor: John Koshar, Tumacacori, AZ (US)

( * ) Notice: Subject to any disclaimer, the term of this patent is extended or adjusted under 35 U.S.C. 154(b) by 191 days.

(21) Appl. No.: 15/929,524

(22) Filed: May 7, 2020

(65) Prior Publication Data
US 2021/0032928 A1  Feb. 4, 2021

Related U.S. Application Data

(63) Continuation-in-part of application No. 15/908,658, filed on Feb. 28, 2018, now abandoned.

(51) Int. Cl.
*E06B 7/18* (2006.01)
*A01M 29/30* (2011.01)
*E06B 7/23* (2006.01)

(52) U.S. Cl.
CPC ............... *E06B 7/18* (2013.01); *A01M 29/30* (2013.01); *E06B 7/23* (2013.01)

(58) Field of Classification Search
CPC .......... A01M 29/30; E06B 7/28; E06B 9/582; E06B 1/62
See application file for complete search history.

(56) References Cited

U.S. PATENT DOCUMENTS

| | | | | |
|---|---|---|---|---|
| 3,119,158 A | * | 1/1964 | Schornstheimer | .... E05C 19/161 49/478.1 |
| 3,358,402 A | * | 12/1967 | Sahm | ...... E06B 7/231 49/490.1 |
| 3,634,962 A | * | 1/1972 | Peterson | .................... E06B 7/24 49/470 |
| 4,220,189 A | * | 9/1980 | Marquez | ................. E06B 9/582 160/269 |
| 4,356,856 A | * | 11/1982 | Bengtsson | .......... E06B 9/17076 160/209 |
| 4,447,988 A | * | 5/1984 | Cole | ....................... E06B 7/231 49/495.1 |
| 4,463,523 A | * | 8/1984 | Mailand | ................ E06B 7/2316 49/470 |
| 4,497,137 A | * | 2/1985 | Nelson | .................... E06B 7/231 49/495.1 |

(Continued)

FOREIGN PATENT DOCUMENTS

CA     2694300 A1 *  1/2009  .......... E05D 15/165

*Primary Examiner* — Marcus Menezes
(74) *Attorney, Agent, or Firm* — University of Arizona IP Clinic

(57) ABSTRACT

A barricade used to obstruct the gap between a garage door, weather stripping, a threshold surface and a door frame. The barricade successfully prevents pests from breaching the barricade. The barricade uses a spring assist with low displacement force in order to conform to the changing downward or upward angle when a garage door is being operated. It also includes smooth ceramic or rubber that is magnetized to prevent chaffing to the garage door surface. This barrier stays in-place or rotates relative to the garage door face when encountering foreign objects in the path of the moving garage door. Alternatively, the barriers may be constructed of overlapping and/or abutting material configured to obstruct gaps at door frames and/or at threshold surfaces where a weather stripping and/or weather-stripping bulb provide inadequate obstruction.

1 Claim, 14 Drawing Sheets

(56) References Cited

U.S. PATENT DOCUMENTS

| | | | | |
|---|---|---|---|---|
| 4,643,239 A * | 2/1987 | Wentzel | | B60J 5/125 |
| | | | | 160/209 |
| 4,957,301 A * | 9/1990 | Clay, Jr. | | B60J 5/14 |
| | | | | 277/572 |
| 5,216,839 A * | 6/1993 | Woodruff | | E06B 5/003 |
| | | | | 49/495.1 |
| 5,295,326 A * | 3/1994 | Dickey | | E06B 7/18 |
| | | | | 49/482.1 |
| 5,435,104 A * | 7/1995 | Dietrich | | B60J 10/84 |
| | | | | 49/475.1 |
| 5,784,834 A * | 7/1998 | Stutzman | | E06B 7/2307 |
| | | | | 49/197 |
| D408,559 S * | 4/1999 | Rekret | | D25/119 |
| 6,065,525 A * | 5/2000 | Wells | | E06B 9/58 |
| | | | | 160/273.1 |
| 6,167,657 B1 * | 1/2001 | Burge | | B29C 48/12 |
| | | | | 156/244.11 |
| 6,374,567 B1 * | 4/2002 | Mullet | | E06B 9/582 |
| | | | | 52/717.03 |
| 6,772,560 B2 * | 8/2004 | Dischiant | | E06B 7/23 |
| | | | | 49/197 |
| 6,772,561 B1 * | 8/2004 | Berger, Jr. | | E06B 7/232 |
| | | | | 160/40 |
| 7,089,990 B2 * | 8/2006 | Hormann | | E05D 15/165 |
| | | | | 160/40 |
| 7,464,743 B1 * | 12/2008 | Berger, Jr. | | E06B 9/581 |
| | | | | 160/133 |
| 8,881,464 B1 * | 11/2014 | Huckeba | | E06B 1/6046 |
| | | | | 49/489.1 |
| 8,887,790 B2 * | 11/2014 | Drifka | | E06B 9/581 |
| | | | | 160/273.1 |
| 9,045,937 B2 * | 6/2015 | Peck | | E06B 7/16 |
| 9,322,212 B2 * | 4/2016 | Drifka | | E06B 9/581 |
| 9,759,006 B2 * | 9/2017 | Davis | | E06B 7/28 |
| 9,845,638 B1 * | 12/2017 | Cunningham | | E06B 7/231 |
| 2006/0064937 A1 * | 3/2006 | Danczek | | E06B 7/22 |
| | | | | 49/475.1 |
| 2008/0093037 A1 * | 4/2008 | Kraeutler | | E06B 9/58 |
| | | | | 160/271 |
| 2012/0047811 A1 * | 3/2012 | Weeks | | E06B 7/28 |
| | | | | 49/460 |
| 2012/0131854 A1 * | 5/2012 | Pettingill | | E06B 7/2316 |
| | | | | 49/478.1 |
| 2012/0241110 A1 * | 9/2012 | Drifka | | E06B 9/58 |
| | | | | 160/238 |
| 2012/0304543 A1 * | 12/2012 | Preising, Jr. | | E06B 7/2314 |
| | | | | 49/495.1 |
| 2013/0061525 A1 * | 3/2013 | Drifka | | E06B 9/582 |
| | | | | 49/501 |
| 2015/0101765 A1 * | 4/2015 | Drifka | | E06B 9/56 |
| | | | | 428/157 |
| 2017/0175437 A1 * | 6/2017 | Mitchell | | E06B 7/231 |

* cited by examiner

Plan view
- ON POSITION

Plan view
- OFF POSITION

Partial Perspective View
- ON POSITION

Partial Perspective View
- OFF POSITION

PEST BARRICADE

This invention is a continuation-in-part application of Ser. No. 15/908,658, titled: Novel Pest Barricade, filed. Feb. 28, 2018 and is herein incorporated by reference.

BACKGROUND

While many barricades exist, there is still a need for barricades that can completely block the space between the door corner and the door frame to prevent the entry of pests. None of the barricades currently available completely prevent pests from entering into the garage through the cavity formed at the bottom and side parts of the door frame and door corners. Pests include any unwanted mammals, insects, and invertebrates, for example, rodents (such as mice, ground squirrels and pack rats), tarantulas, snakes, lizards, etc. The main problem with existing barricades, such as weather stripping, is that it is not robust against intense sun (which causes dry rot, cracking and brittleness) nor gnawing from rodents. Further, other existing barriers, when installed in a door, do not cover the full width of the garage door between the bottom of the door and the threshold surface such as a garage floor, concrete pad or dirt/gravel driveway. These gaps at the garage door bottom corners and/or under the door, is where the pests enter into the garage's interior.

Automatic garage doors have two mechanisms to prevent injuries being caused when the door is in the closing mode of operation. One being where an object, crossing the threshold travel path, provides a break in an optical signal that stops the door from completely closing or crushing the object. Another safety mode is triggered in the closing mode of operation where the door stops and then opens to the fully open position if the door assembly senses approximately eleven pounds of resistance. These mechanisms are triggered when a sensor detects an optical or physical obstruction. These mechanisms prevent crushing damage to automobiles and household items and prevents injuries to people and pets. However, none of the existing barricades have an anti-crushing, anti-lift or over-rotation mechanism for protection when the obstacle is not in the optical path nor can trigger a force of 11 pounds.

Protuberant objects attached to automatic doors can cause injuries when an external object is close enough to be hooked by the protuberant object. This is a well-known fact at industrial work site settings and home environments. When the door is moving, clothes or similar material worn by or in possession by an individual can be hooked, ripped or damaged and the individual themselves be lifted or pushed-downward to the extent of a resultant injury. For example, if a person is standing close enough to the door, the person's clothes or similar material or body portion can be hooked by the protuberant objects attached to the door while it is closing or opening causing them to be unexpectedly caught and travel in the force's direction. None of the existing barricades prevent external objects from hooking, hanging or crushing from the door's direction and force of motion.

Embodiments of the present invention solve these problems in a very unique manner and effectively prevent rodents and other pests from entering into a garage or similar area. It is inexpensive to produce, easily trimmed and/or bent-to-fit as required if necessary, easily installed by the homeowner, and requires no maintenance other than painting or finishing per homeowner's preference at initial installment and maintaining desired finish and appearance.

SUMMARY

The present invention relates to barricades and, more particularly, barricades located on the bottom edges of a garage door. The embodiments of the present invention result in pest barricades that are safe for peoples, pets, poison-free, and do not constitute animal cruelty. They are simple and durable devices that are relatively inexpensive to produce, easily installed by the homeowner, their employed handyman, or home builder. They require no maintenance other than painting. The embodiments of the present invention deter pest intrusion through the open space into the garage interior while providing additional safety measures for door operation.

BRIEF DESCRIPTION OF THE DRAWINGS

The embodiments of the present invention will be better understood from a reading of the following description taken in conjunction with the drawings in which like reference designators are used to designate like elements, and in which.

DESCRIPTION

The foregoing embodiments are to be considered for illustrative purposes and as an exemplification of the principles of the invention and are not intended to limit the broad aspects of the invention to the specific embodiments illustrated herein. The features, structures, or characteristics of the invention as disclosed in any one preferred embodiment, for example, may be rearranged or combined with the features, structures or characteristics in any other embodiment. One skilled in the relevant art will also recognize that the invention may be practiced without one or more of the specific details, or with other methods, components, materials, and so forth. In other instances, well-known structures, materials, or operations are not shown or described in detail to avoid obscuring aspects of the invention.

Figure 1:
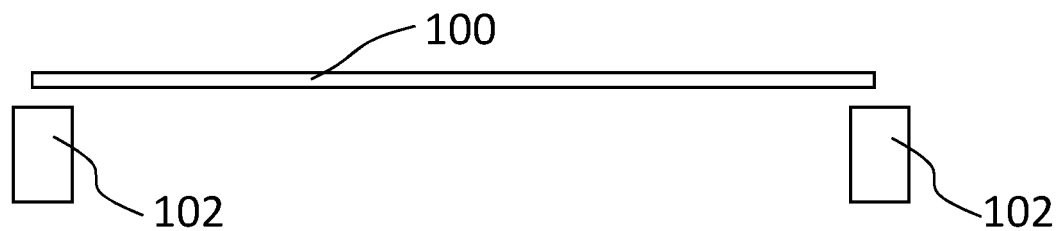
FIG. 1A illustrates a top view of the garage door and the door frame.
FIG. 1B illustrates a front view of the garage door and door frame.
Figure 1:
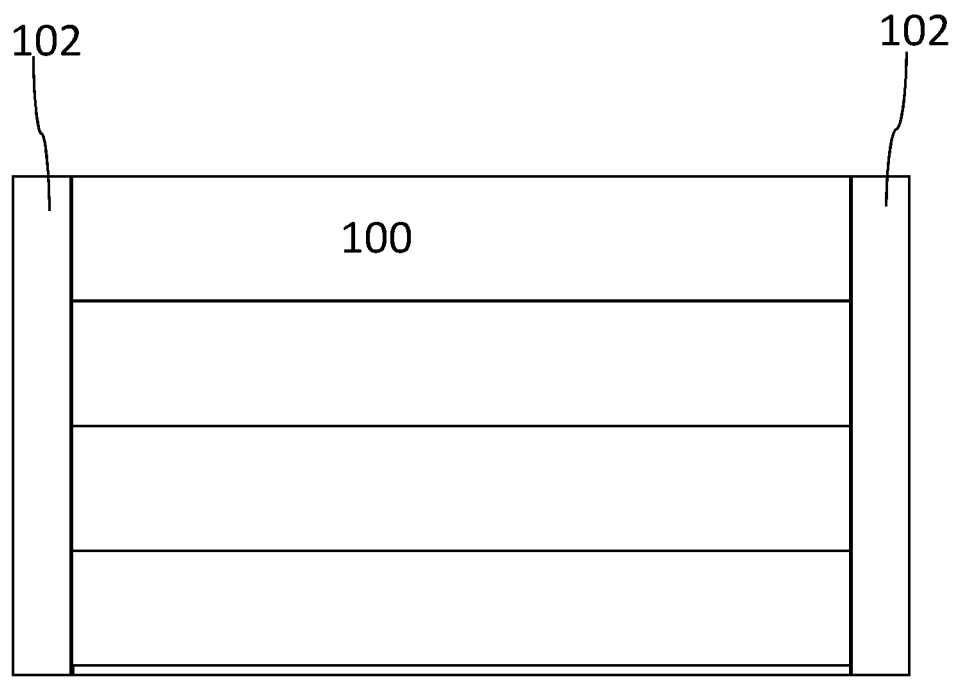

FIGS. 1A and 1B are an example of a garage door 100 and a door frame 102 that are used in common households.

Figure 2A:
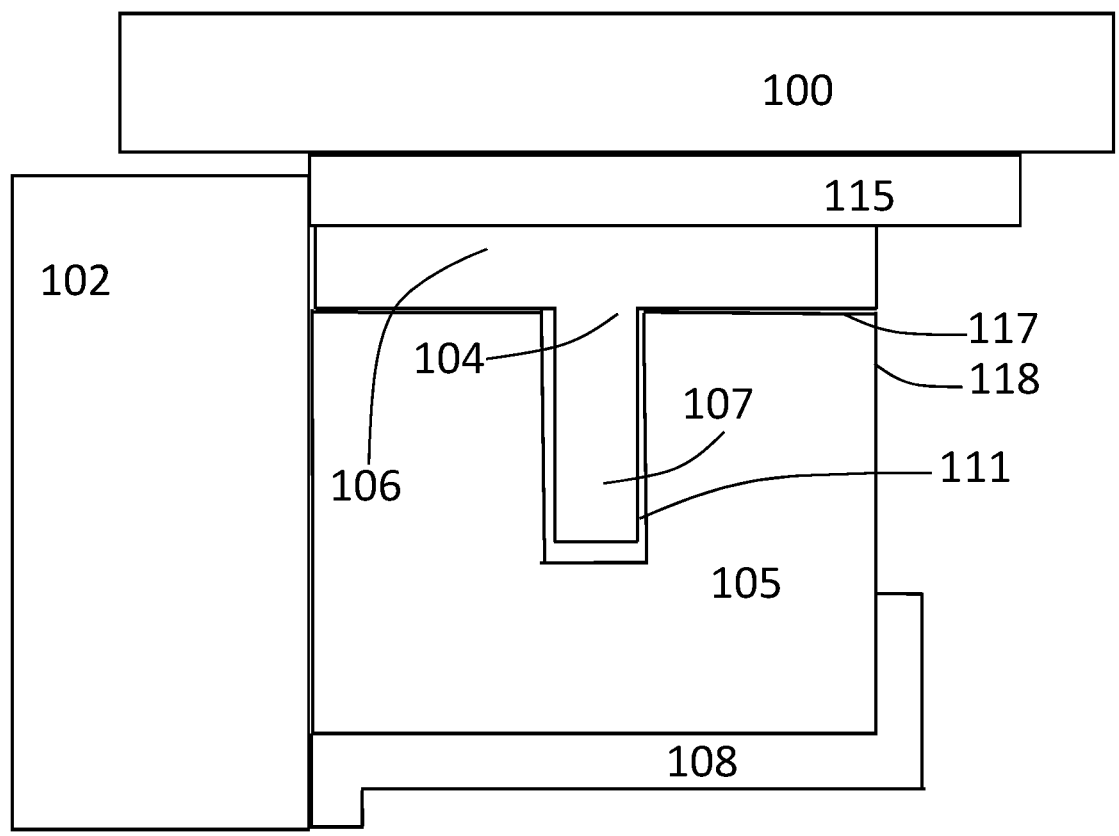
FIG. 2A shows a top view of an embodiment of the barrier sealing the space between the door and door frame when the door is fully closed.

FIG. 2A is an example of the proposed barricade and its housing. It includes: a housing 105 which is affixed to the door frame 102. The housing 105 partially encloses a T-shape extrusion 104 that provides the various components that will provide the barrier enclosure. Attached to the T-shape extrusion 104 is a magnetic rubber seal 115 that provides a stronger force from the door frame, against the garage door. A Z-fixing member 108 also slidably couples the housing 105 to the door frame 102. The housing 105 has a first side 117 and a second side 118. The T-shape extrusion 104 inserts into the first cavity 111 located on the first side 117 of the housing 105. The magnetic rubber seal 115 is attached to the first member 106 of the T-shape extrusion 104. The magnetized face of the magnetic rubber seal 115 is facing the door 100.

Figure 2B:
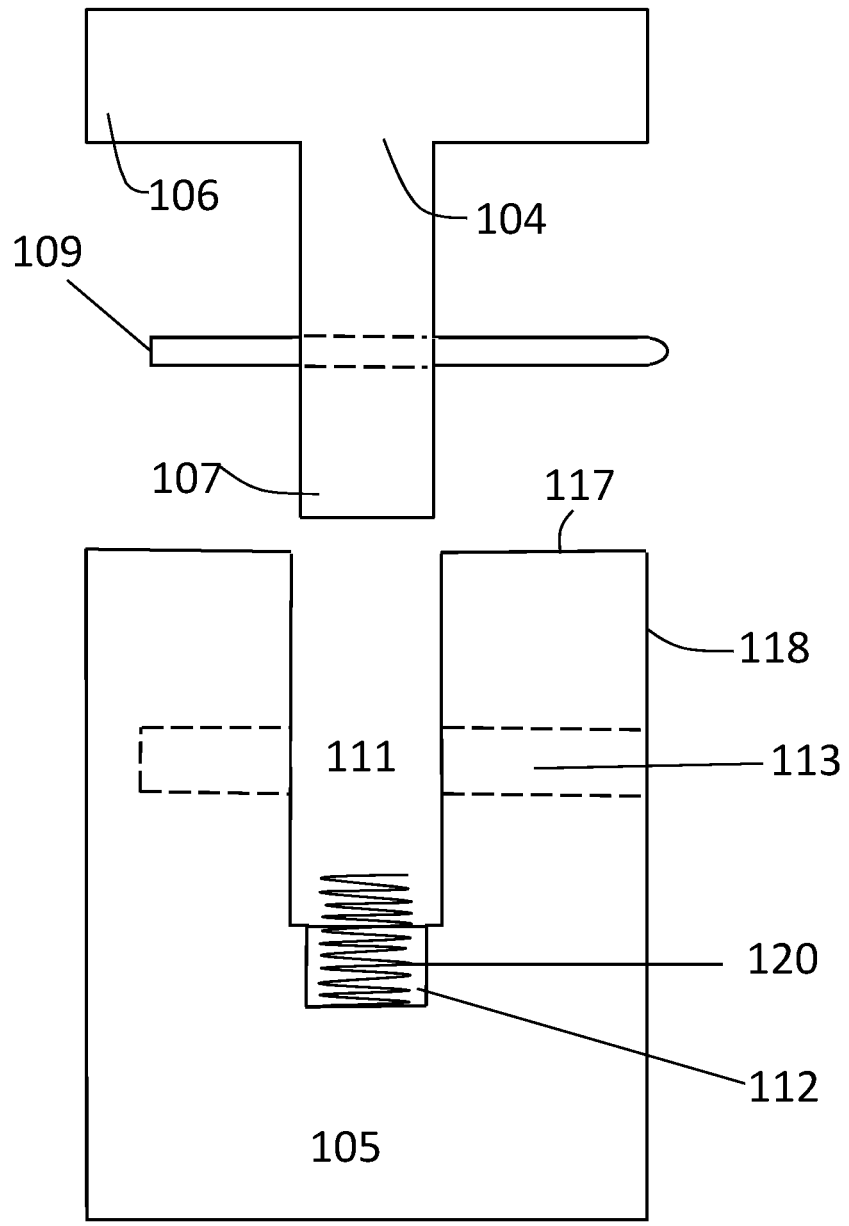
FIG. 2B illustrates a plan view of an embodiment of the barrier, showing the interaction between the T-shape extrusion and the stop member with the housing and the spring.

In FIG. 2B, the T-shape extrusion 104 is formed by a first member 106 and a second member 107. The housing 105 also has a first cavity 111, a second cavity 112, and a third cavity 113. The first cavity 111 is on the first side 117. The second cavity 112 is connected to the first cavity 111. The third cavity 113 is located on the second side 118. A stop member 109 fully crosses the second member 107 of the T-shape extrusion 104. The second member 107 of the T-shape extrusion 104 inserts into the first cavity 111. The stop member 109 crossing the second member 107 of the T-shape extrusion 104 inserts into the third cavity 113 of the housing 105. A spring 120 is disposed between the second cavity 112 and first cavity 111 of the housing 105.

Figure 2C:
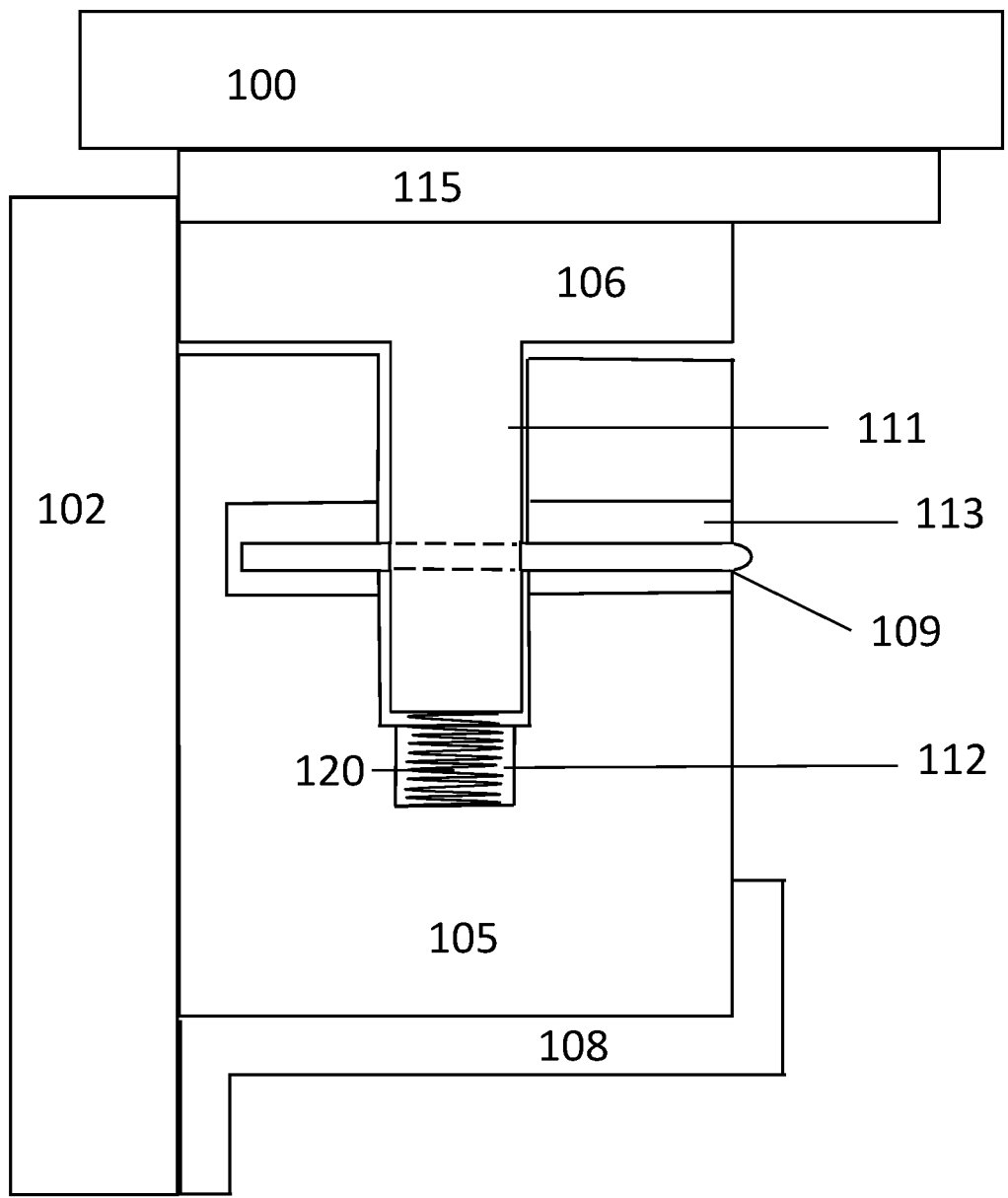
FIG. 2C shows a top plan view of an embodiment of the barrier in the on position when the garage door is fully closed, sealing the space between the door and door frame.

In FIG. 2C, the door 100 is fully closed and the space between the door 100 and the door frame 102 is completely sealed. The barrier is in an on position as the spring 120 is compressed. The spring 120 pushes the bottom part of both the T-shape extrusion 104 and the magnetic rubber seal 115 against door 100. The stop member 109 rests in the third cavity 113. The housing 105 and the Z-fixing member 108 remain in a static position and affixed to the door frame 102.

Figure 2D:
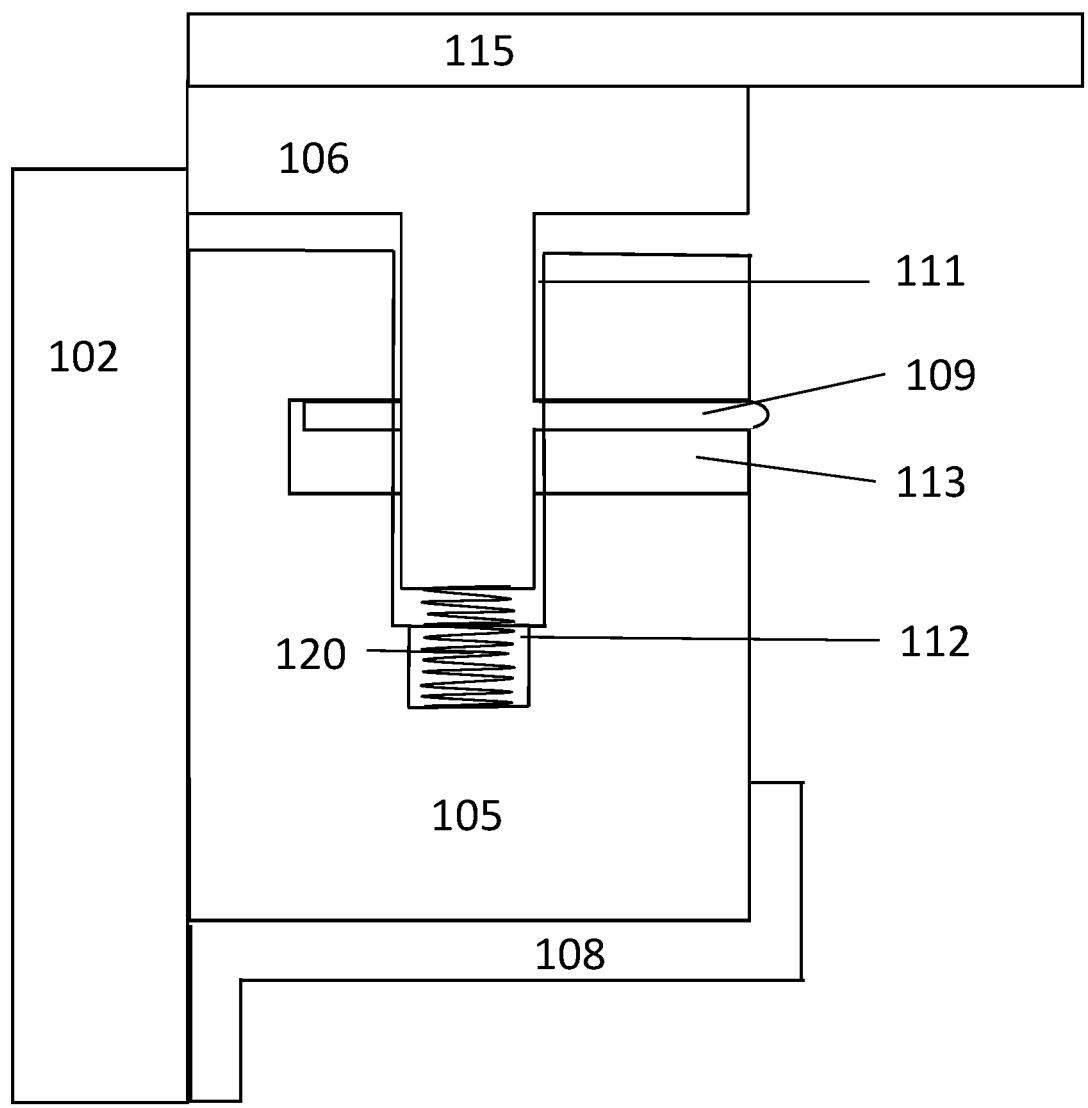
FIG. 2D illustrates a plan view of an embodiment of the barrier in the off position when the door is open or in a closing transition; showing the movement of the T-shape extrusion.

In FIG. 2D, door 100 is in an open or partially open position. The barrier is in an off position because the spring 120 is distended. Spring 120 at the bottom part of both the T-shape extrusion 104 and the magnetic rubber seal 115 are distal from the housing 105. Stop member 109 stops the T-shape extrusion 104 from going further by resting at the edge of the third cavity 113. Housing 105 and Z-fixing member 108 remain static and affixed to the door frame 102.

Figure 3A:
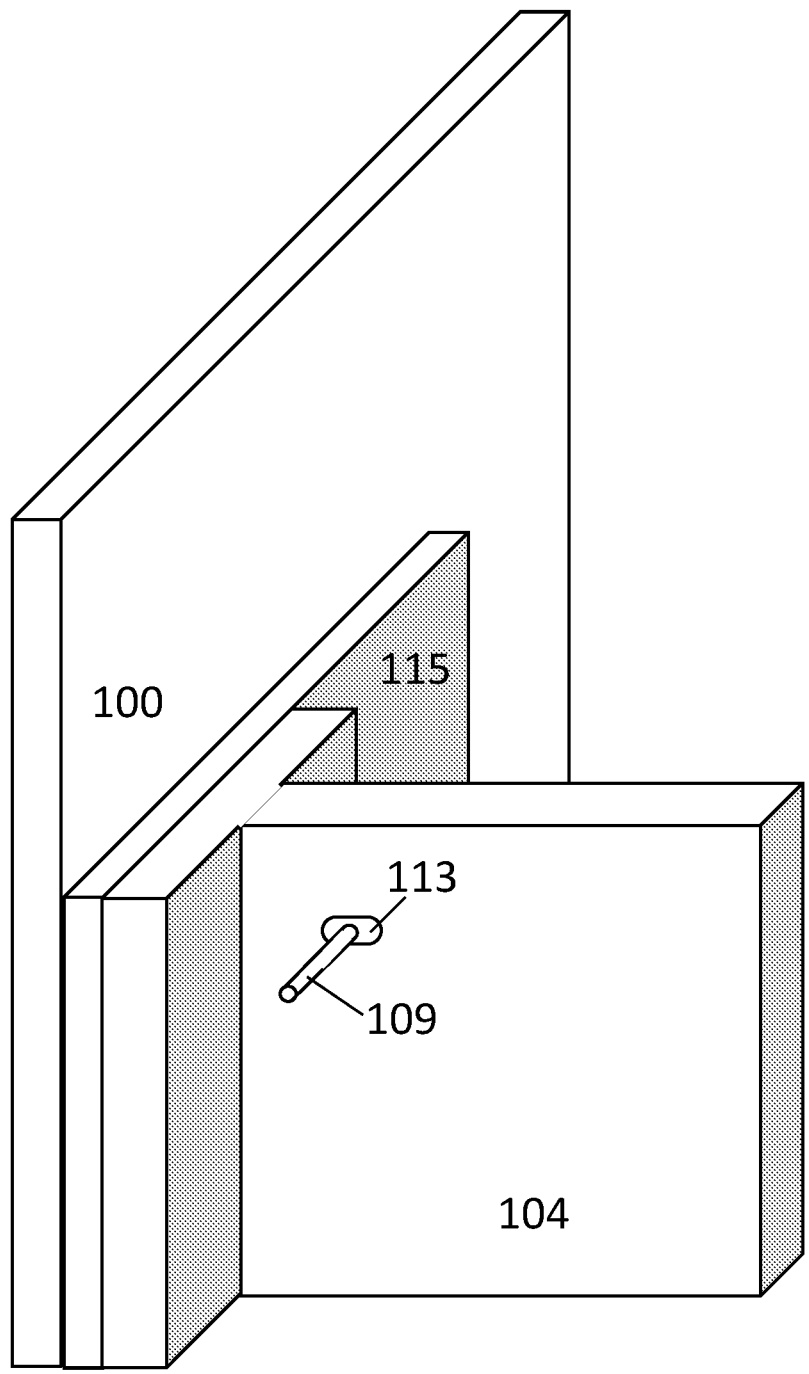
FIG. 3A shows a partial perspective plan view of the embodiment of the barrier of FIG. 2C in the on position.

In FIG. 3A, housing 105, Z-fixing member 108, and spring 120 are not shown. The barrier is in the on position. The space between the door 100 and the door frame 102 is sealed. Spring 120 (not shown) pushes the bottom part of both the T-shape extrusion 104 and the magnetic rubber seal 115 against door 100. The stop member 109 rests in the third cavity 113.

Figure 3B:
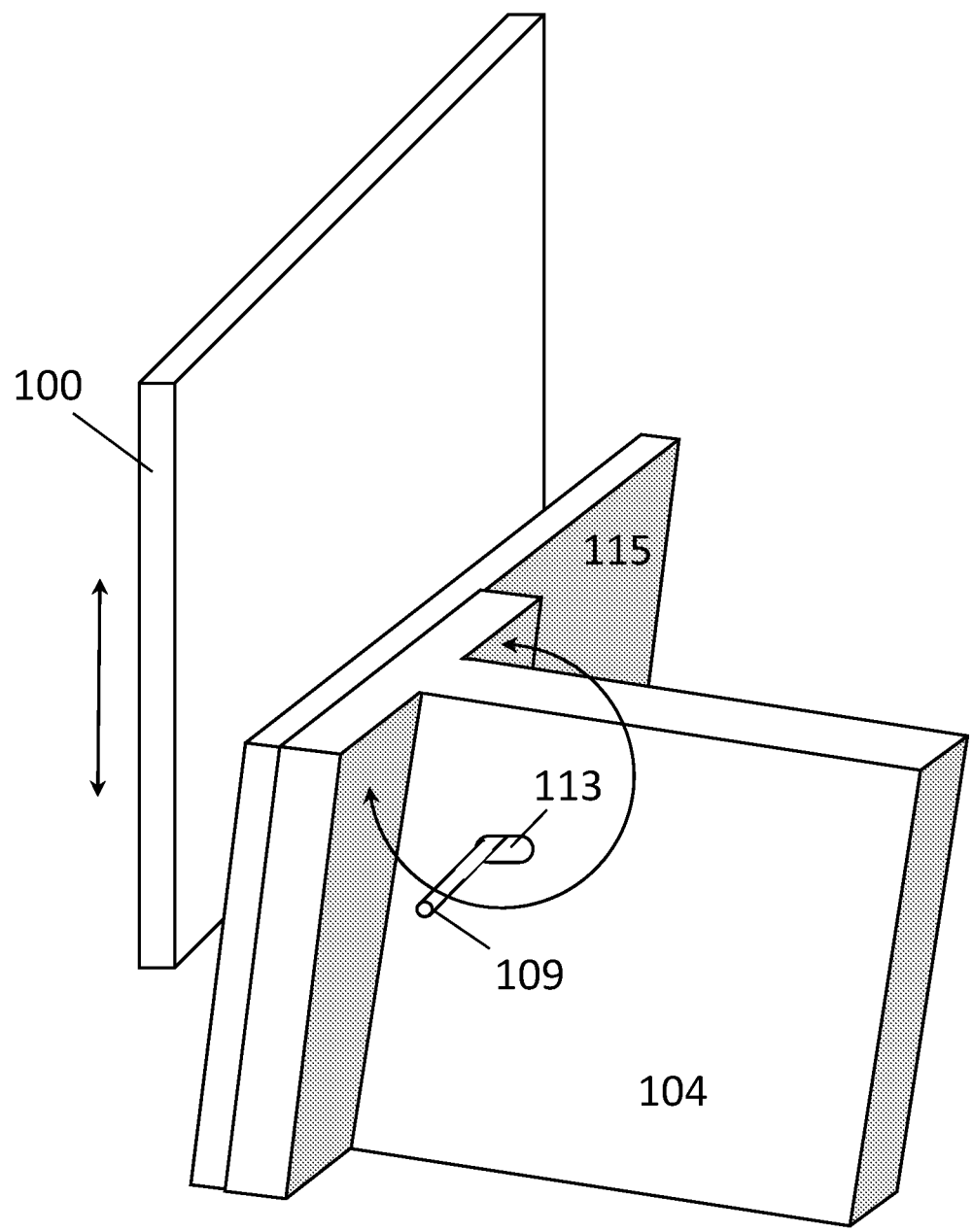
FIG. 3B shows a partial perspective plan view of the embodiment of the barrier of FIG. 2D in the off position.

In FIG. 3B, housing 105, Z-fixing member 108, and spring 120 are not shown. The barrier is in the off position and door 100 is partially open. Spring 120 pushes the bottom part of both the T-shape extrusion 104 and the magnetic rubber seal 115 distal from the housing 105. The stop member 109 stops the T-shape extrusion 104 from going further by resting at the edge of the third cavity 113.

Figure 3C:
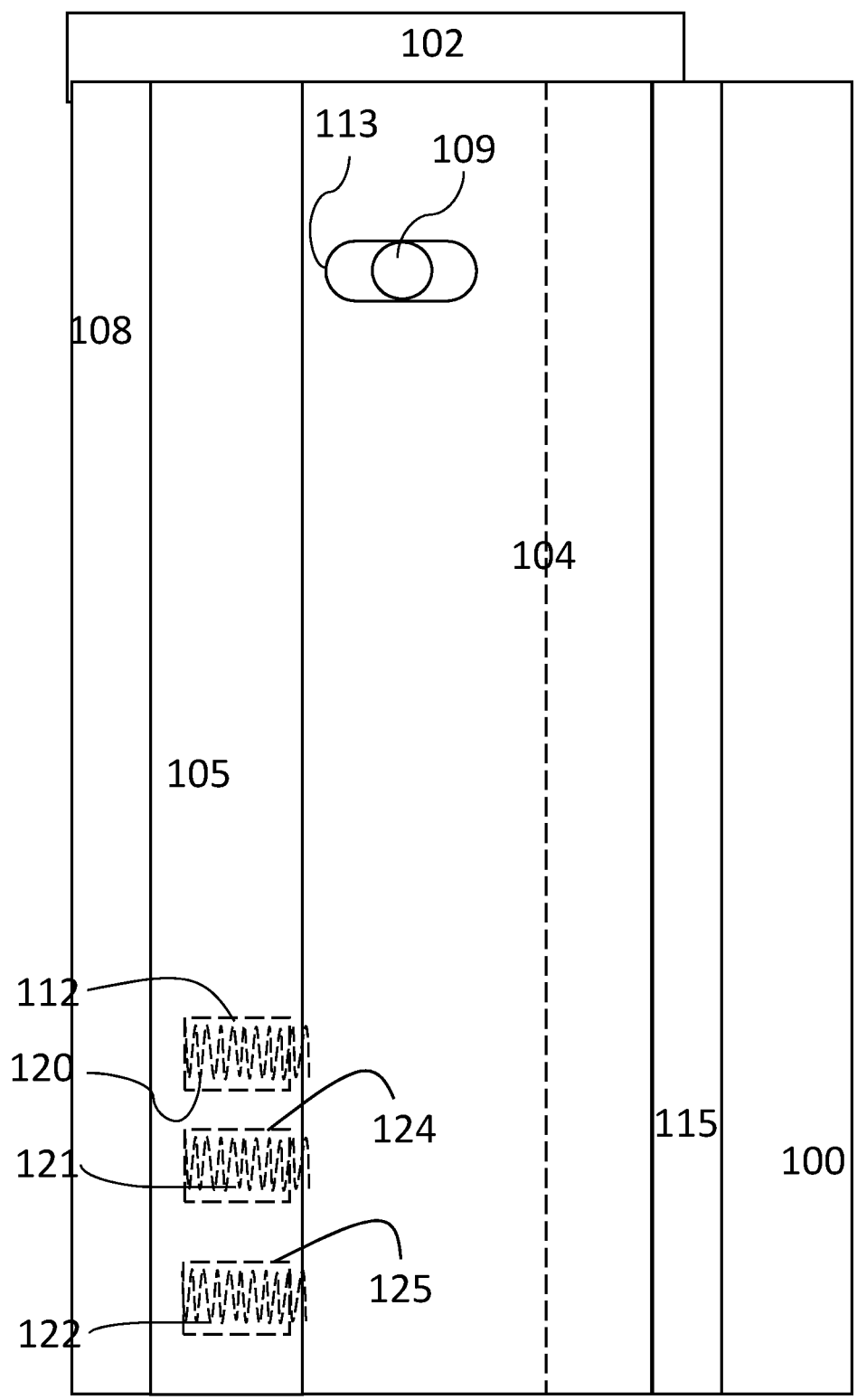
FIG. 3C shows a side view of an example of the barrier of FIG. 2C in the on position, showing the position of three springs.
Figure 3D:
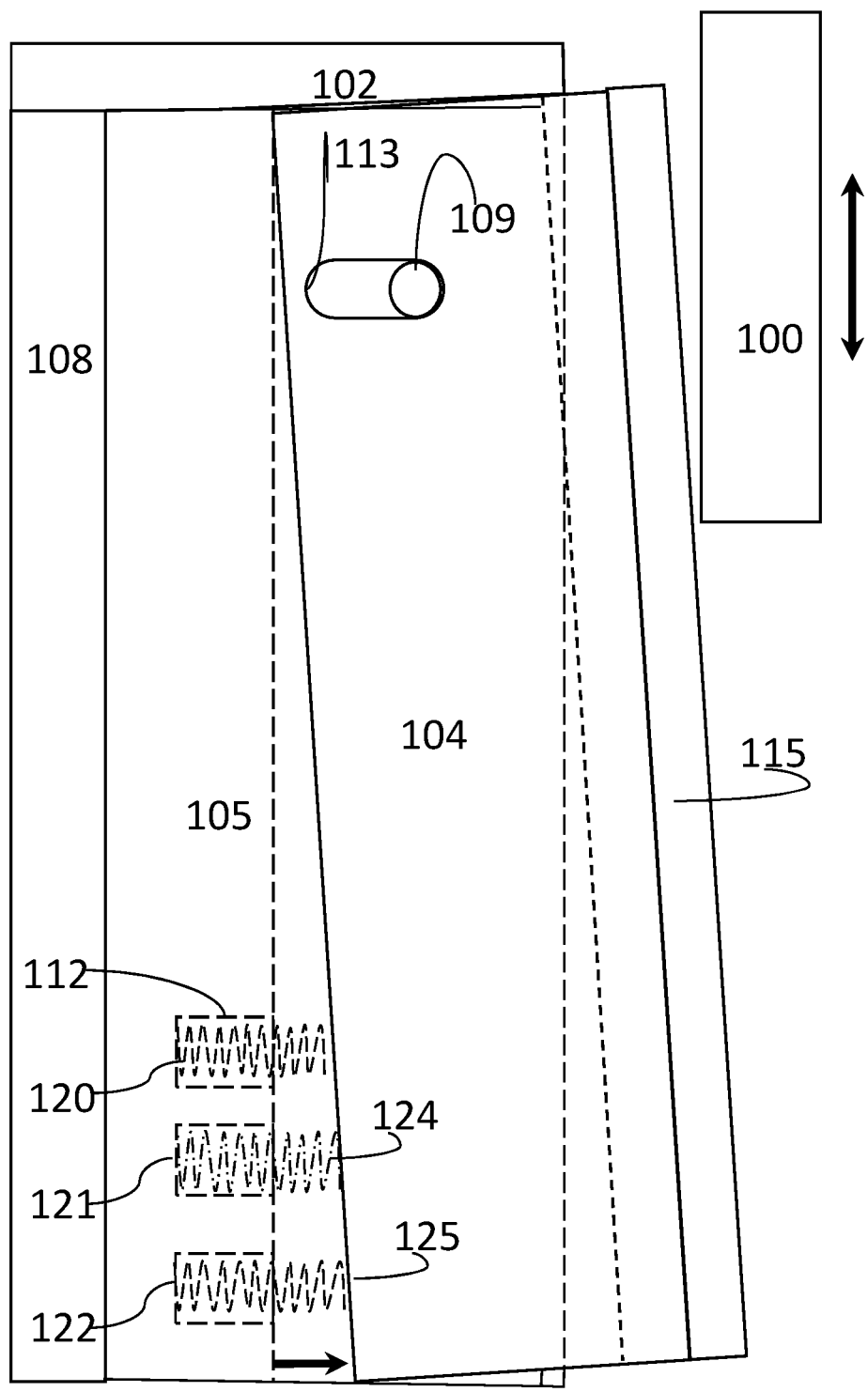
FIG. 3D shows a side view of the example barrier of FIG. 2D in the off position, showing the position of three springs.

FIGS. 3C and 3D show an alternative embodiment of the barricade using three springs and therefore, compressing more forcefully the T-shape extrusion 104 and the magnetic rubber seal 115 against the door 100. Housing 105 has a fourth cavity 124 and a fifth cavity 125. The first spring 120 is disposed in the second cavity 112. The second spring 121 is disposed in the fourth cavity 124. The third spring 122 is disposed in the fifth cavity 125.

In FIG. 3C the barrier is in the on position. Springs 120, 121, and 122 push the bottom part of the both the T-shape extrusion 104 and the magnetic rubber seal 115 against the door 100. The stop member 109 rests in the third cavity 113. The housing 105 and Z-fixing member 108 remain static and affixed to the door frame 102.

In FIG. 3D the barrier is in the off position. The springs 120, 121, 122 are extended and pushing the bottom part of both the T-shape extrusion 104 and the magnetic rubber seal 115 against the door 100. Stop member 109 stops the T-shape extrusion 104 from going further by resting at the edge of the third cavity 113.

Figure 4A:
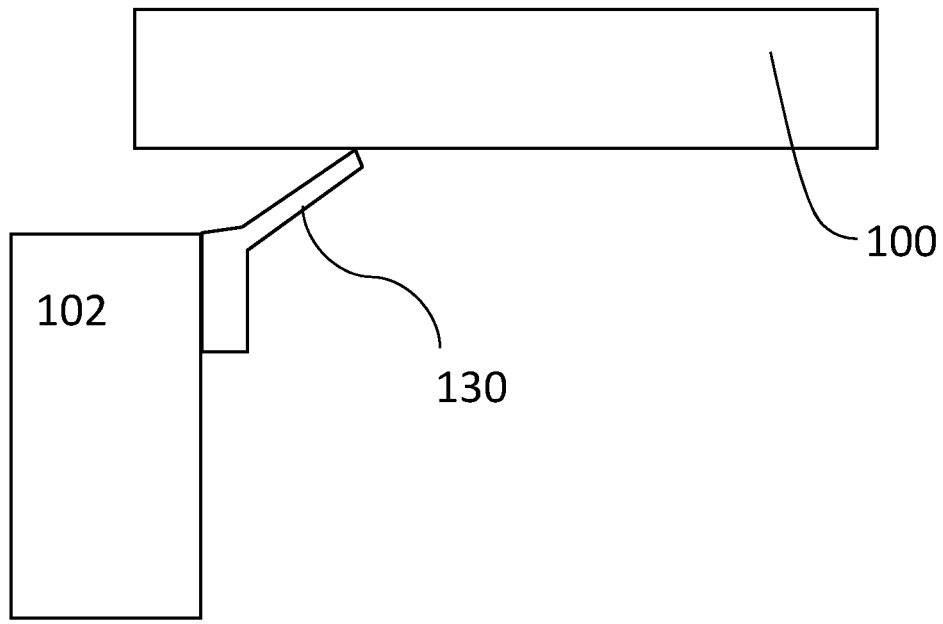
FIG. 4A illustrates a top plan view of the door, which shows the relative proximity of a door frame and weather stripping.

In FIG. 4A, a weather stripping 130 is affixed to the door frame 102 and is adjacent to garage door 100 surface to create a seal.

Figure 4B:
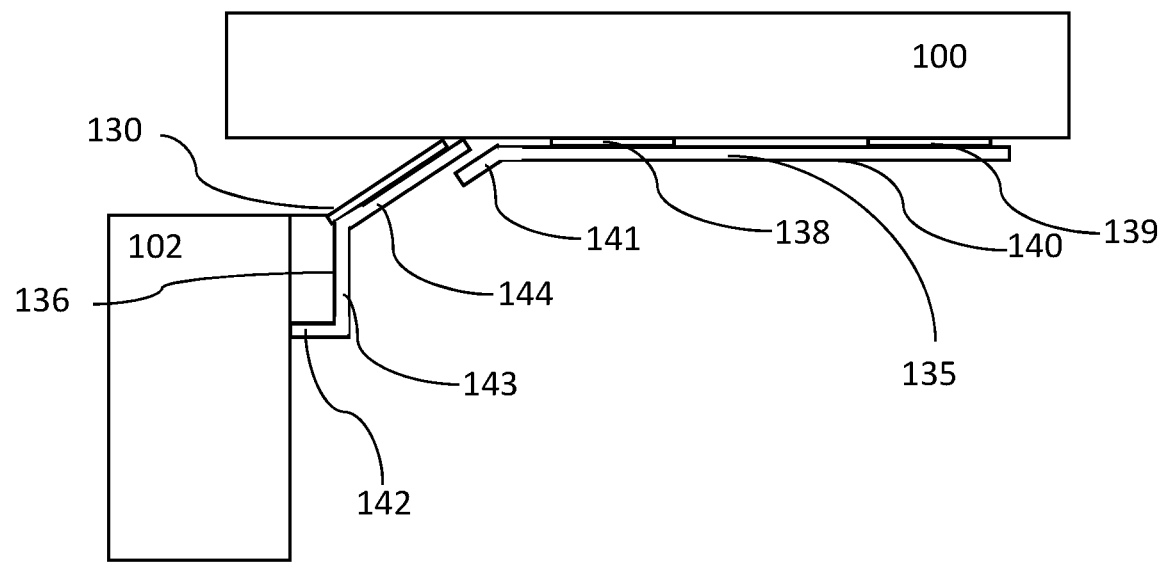
FIG. 4B illustrates a top plan view of FIG. 4A and a barricade according to an embodiment of the invention.
Figure 5A:
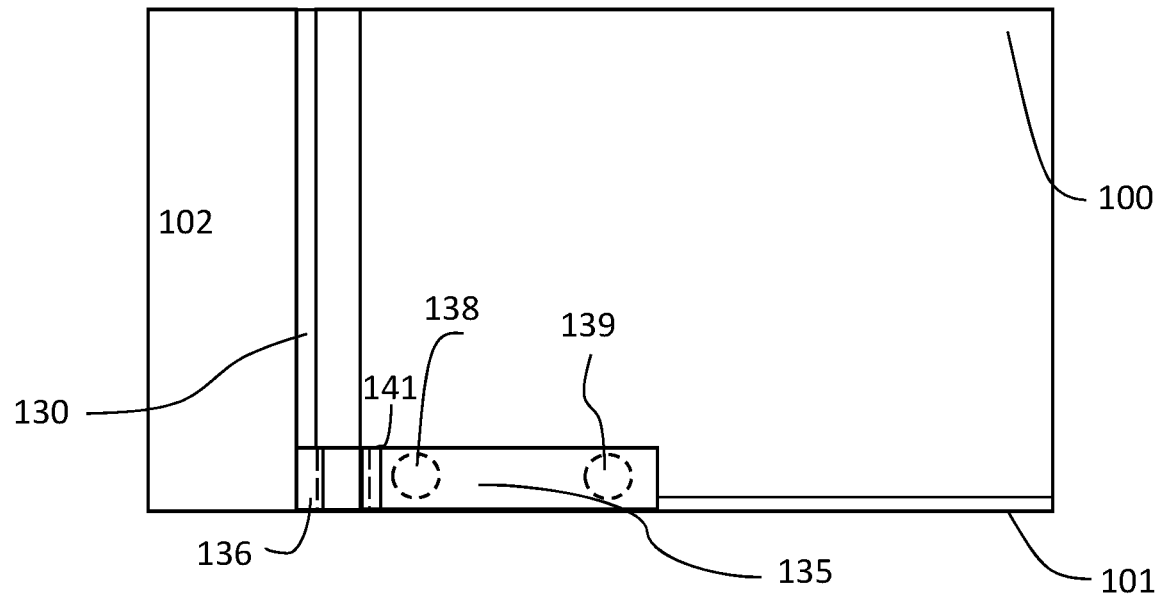
FIG. 5A shows a front view of an alternate embodiment of the barrier when the door is fully closed.
Figure 5B:
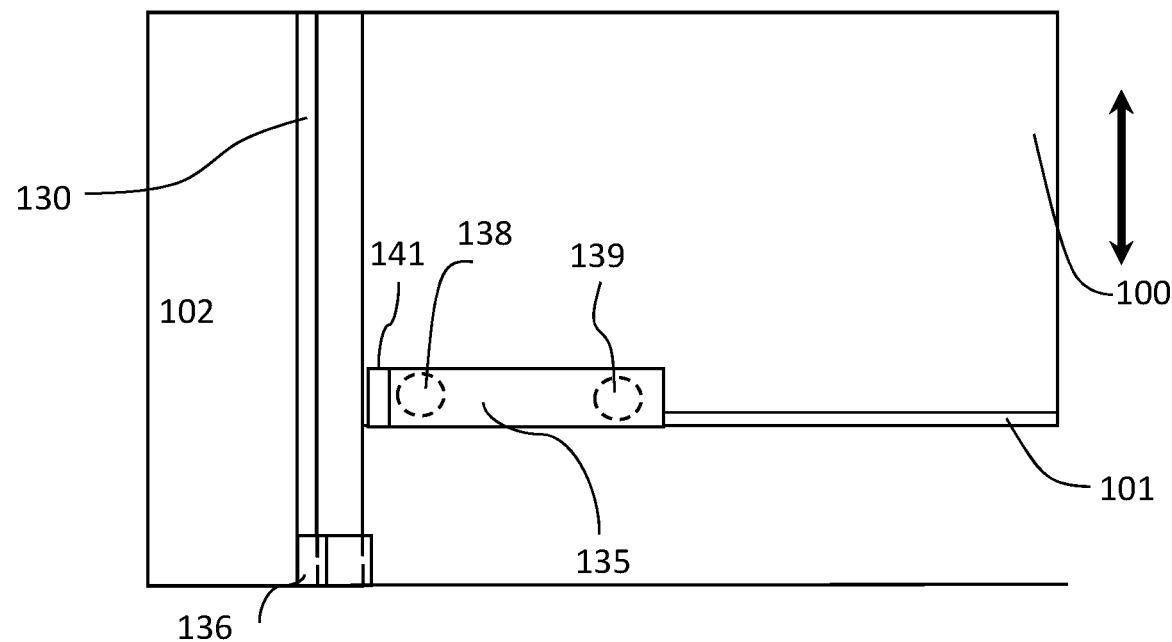
FIG. 5B shows a front view of the alternate embodiment of the barrier when the door is partially open.

FIGS. 4B, 5A and 5B, are another embodiment example of the barrier containing a first barrier plate 135 and second barrier plate 136. In FIG. 5A the door 100 is in the closed position, whereas in FIG. 5B the door 100 is in the open position. A first barrier plate 135 made from approximately 30 or 28-gauge low carbon steel with a protective galvanized or painted surface and a total length of approximately 8-to-13 inches long and approximate height of 3 inches, has a first flat portion 140 approximately 7-to 12 inches long and a second bent portion 141, the bend is full-height at approximately 30 degrees and approximately 1" long measured from portion 140 bend-line, resulting in a bent material projection approximately ½" from the face of portion 140. The first portion 140 attaches to the face feature of door 100 via the magnetic force of a first magnet 138 and second magnet 139. The magnets 138 and 139 may be comprised of ceramic, or magnetized rubber or a rubber-like substance or any other suitable combination of other magnetic material, possessing a smooth surface to promote magnetic adherence and avoid chafing door 100. Said magnets are of size and combined thickness to provide sufficient adherence strength during all manner of inclement weather conditions for attachment to door 100 face and fit within the portion's 140 size height allowance and may be circular or rectangular in shape. Said magnets should also be spaced such that they are located on separate edges, leading and trailing, of the first portion 140, and not to exceed a lateral distance spacing between magnets of approximately 12". Magnets 138 and 139 are placed on the first portion 140 face that is opposite of the second bent portion 141 direction and towards the face feature of garage door 100, near leading and trailing edges of the first portion 140. Said magnets are held in-place by their own magnetic force or suitable exterior quality adhesive. The second bent portion 141 angled feature is oriented outward facing from the face feature of door 100. The second barrier plate 136 attached to the outward facing lower portion weather stripping 130 using standard attachment hardware and methods or suitable exterior quality adhesive. The second barrier plate 136 possesses bent portions that promote its conforming to the profile of the possible variance of different manufacturers weather stripping 130 profiles. In this case shown here, a second barrier plate 136 made from approximately 30 or 28-gauge low carbon steel with a protective galvanized or painted surface and a total length of approximately 3¼" inches long and approximate height of 3 inches, has a third portion 142, fourth portion 143, and fifth portion 144. The third bent portion 142 is approximately ¼" long and perpendicular to the face of portion 143, covers the outward face of the weather stripping's 130 support body. The fourth portion 143 has a length of approximately 2" inches long covers the in-ward face of the weather stripping's 130 support body. The fifth bent portion 144 is approximately 1" long is bent at an angle near-parallel to and not beyond the weather stripping's flap edge, covering the flexible seal flap of the weather stripping 130. By adjusting this bend angle as needed at installation allows for the fifth bent portion 144 trailing edge never to protrude into the upward and downward action of the door 100. The fifth bent portion is approximately 1" long and the bend is full-height.

FIG. 5A further shows the second barrier plate 136 and first barrier plate 135 with the second portion 141, with magnets 138 and 139, shown in-place, and the second portion 141 edge is up-to and near the edge of the flexible seal flap of weather stripping 130. The two barrier plates 135 and 136 are in-position as intended when they are in contact with the garage door's 100 threshold with the bottom-most edge of their respective portions with the door 100 in the closed position. Additionally, shown in FIG. 5B with the door 100 transitioning OPEN or CLOSED is in the open position, the first barrier plate 135 with two magnets 138 and 139 remains in-place with the bottom-most edge of its respective portions with the door 100 bottom edge door-width weather-stripping bulb 101 distanced established at time of installation or closure. A completed installation for the front of a garage door 100 would involve a mirrored pair of first barrier plate 135 and second barrier plate 136 with same full components shown here in FIG. 5B on the Left-Hand side to the Right-Hand side of said garage door 100 threshold and weather stripping 130 interfaces.

Figure 6A:
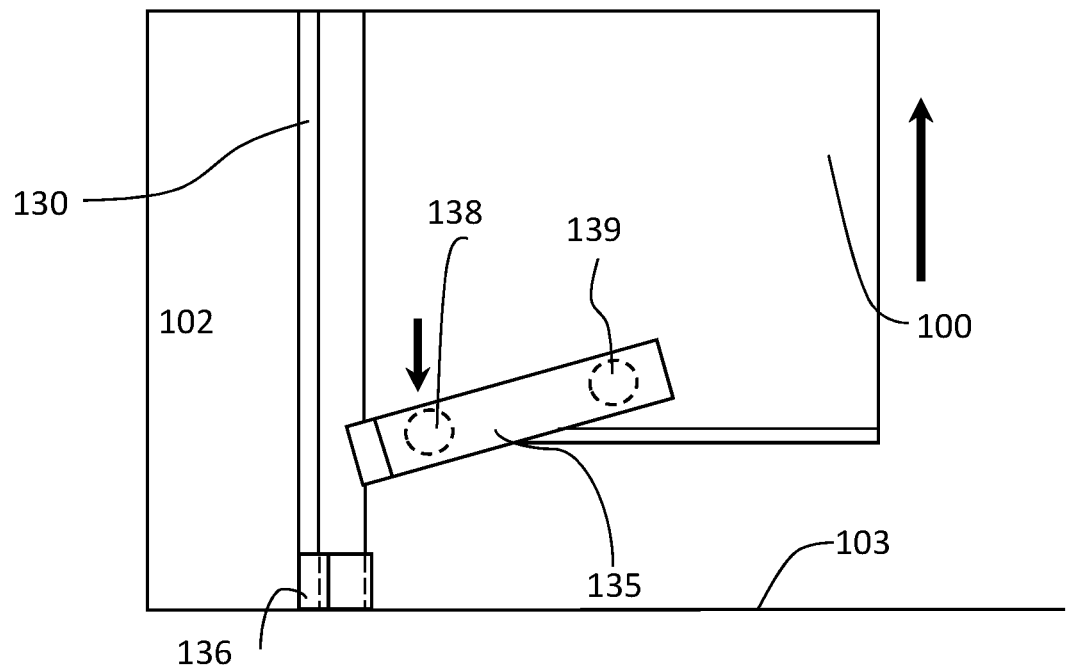
FIG. 6A shows a front view of FIG. 5B and the relative positioning of the barrier as the door opens and has hooked an object learned against the outside of the garage door (not shown)
Figure 6B:
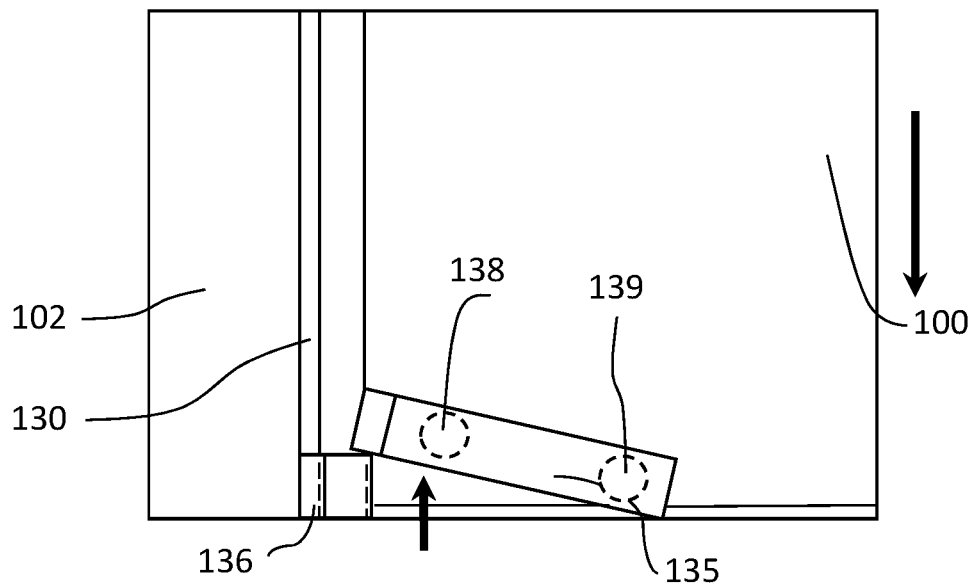
FIG. 6B shows a front view of FIG. 5B and the relative positioning of the barrier as the door closes and has shifted to prevent crushing an object underneath the garage door (not shown)

In FIGS. 6A and 6B, the second barrier plate 136 remains still when the door opens. The first barrier plate 135 is affixed to and moves with the face feature of door 100. The magnet 138 alternatively detaches from the face feature of door 100 while magnet 139 stays attached to the face feature of door 100. The two magnets 138 and 139, set forth in this present invention can, but are not limited to, function as pivot-points, either one of them, as the situation dictates, promoting the pivot-ability of the first barrier plate 135 about them while being in contact with the face feature of door 100. So, compared with other barrier plates that would resist movement without the two magnets 138 and 139, this first barrier plate 135 will remain attached to the face feature of door 100, after being temporally dislodge from its intended positions depicted in FIGS. 5A and 5B.

FIG. 6A shows door 100 in the opening transition position relative to the door frame 102. The first magnet 138 detaches from the face feature of garage door 100 when it encounters interference. For example, a heavy shovel handle leaning against the door. The second magnet 139 keeps the first barrier plate 135 attached to garage door 100 so that the shovel handle does not completely disengage barrier plate 135 from garage door 100. At this stage, the two magnets 138 and 139, set forth in this present invention can, but are not limited to, mechanically react in a desirable fashion upon being dislodged, for example, by inadvertent contact with an individual standing close to the door 100 during time of operation or an article such as a broom's handle or other implement rested upon the face feature of door 100 and not being noticed for removal prior to operation of the door 100 opening and raising mechanism. So, compared with other barrier plates that would resist movement without the two magnets 138 and 139, the operator, once the dislodgement is noticed, easily and readily returns the first barrier plate 135 to its intended positions depicted in FIGS. 5A and 5B under this situation. Such desirable attributes prove to be people and pet-safe. This is due to the designed-in anti-lift performance of the embodiment features promoting rotation during dislodgement of the first barrier plate 135 utilizing the pivot-ability of two magnets 138 and 139. Without said designed-in embodiment feature characteristic performance, other barrier plates would bind, pinch or become forcibly removed from the face feature of door 100 resulting in damage to either or all of the barrier plate, door's surface, door's operation mechanism and possibly contribute to the injury of the operator themselves.

FIG. 6B shows the door in the closed position. The first magnet 138 detaches from the face feature of door 100. The second magnet 139 keeps the first barrier plate 135 attached to the face feature of door 100. At this stage, the two magnets 138 and 139, set forth in this present invention can, but are not limited to, mechanically react in a desirable fashion upon being dislodged, for example, by inadvertent contact while the door was transitioning to the closed position with a small stone or piece of lawn debris that had occupied the intended contact area that is between the first barrier plate 135 in relation to the door 100 threshold 103 shown in FIG. 6A. In another example, an individual walking close to the door 100 while the door 100 is at-rest and in the closed position, shown in FIG. 5A, bumps the first barrier plate 135 in relation to the door 100 threshold shown in FIG. 5A with enough force to dislodge the first barrier plate 135 without damage to said barrier plate or themselves. So, compared with other barrier plates that would resist movement without the two magnets 138 and 139, the operator, once the dislodgement is noticed, easily and readily returns the first barrier plate 135 to its intended positions depicted in FIGS. 5A and 5B under this situation. Such desirable attributes prove to be people and pet-safe. This is due to the designed-in anti-crush characteristic of the embodiment features promoting rotation during dislodgement of the first barrier plate 135 utilizing the pivot-ability of two magnets 138 and 139. Without said designed-in embodiment feature characteristic performance, other barrier plates (e.g. those that have been permanently affixed to garage door 100) would bind, pinch or become forcibly removed from the face feature of garage door 100 resulting in damage to either or all of the barrier plate, door's surface, door's operation mechanism and possibly contribute to the injury of the operator themselves.

The first barrier plate is magnetically coupled to the bottom portion of the door by a first and a second magnet. The first magnet is located near the first distal end of the first barrier plate and the second magnet is located near a second distal end of the first barrier plate; and the second distal end is opposite from the first distal end such that either the first magnet or the second magnet may detach from the door without decoupling the first barrier plate, in its entirety, from the bottom portion of the door;

The first magnet is located near the first distal end of the first barrier plate and the second magnet is located near a second distal end of the first barrier plate; and wherein the second distal end is opposite from the first distal end such that the barrier plate may pivot relative to the first or second magnet to perform at least one of pivoting the barrier plate without decoupling from the bottom portion of the door and obstructing the bottom edge space between the door and the uneven threshold surface.

Figure 7A:
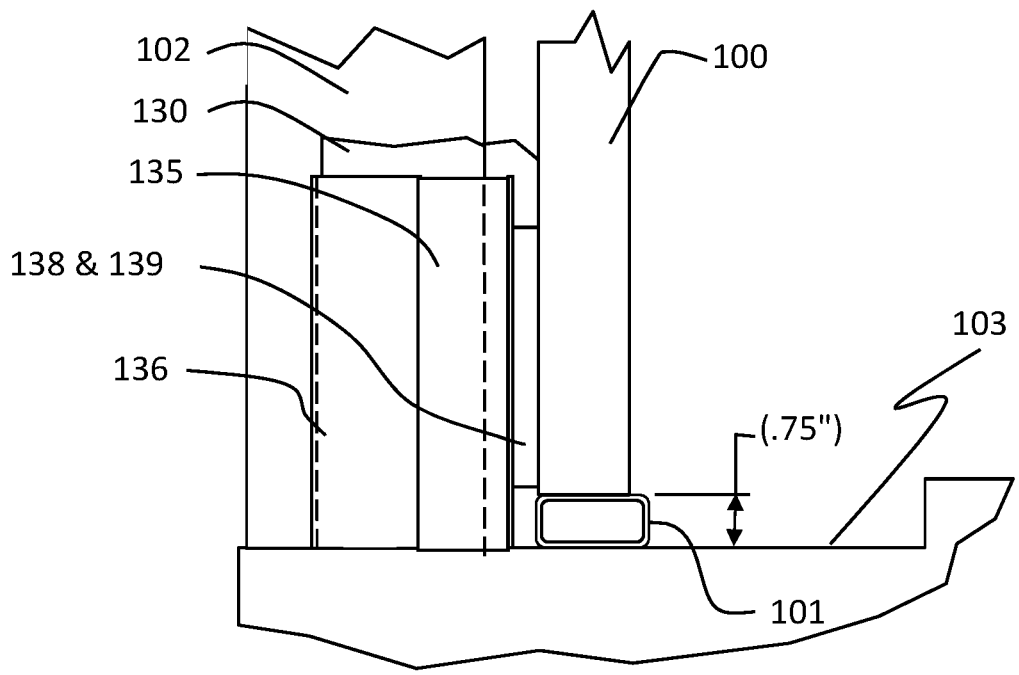
FIG. 7A shows a side view of FIG. 5A and the relative positioning of the barrier when the door is fully closed.
Figure 7B:
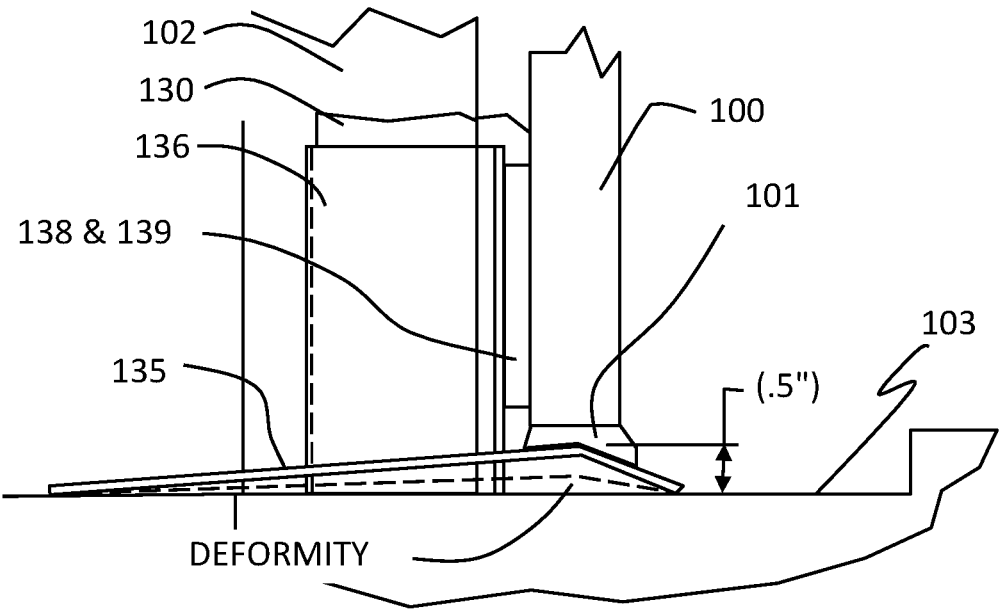
FIG. 7B shows a side view of FIG. 7A with barrier on ground as the door closes.

FIGS. 7A and 7B, show the designed-in flattening characteristic of barrier plate 135. This ability to deform (as shown in FIG. 7B along the dotted line) may be resultant of the material type selection coupled with the construction dimensions of barrier plate 135 and similar variances (e.g. shown in FIGS. 8A and 8B), employed to further distinguish this multi-portion barrier plate from other designs. Barrier plate 135 may be manufactured from a gauge range of low carbon steel. First flat portion 140 and a second bent portion 141 at approximately 30 degrees (internal angle) provides yet another measure of safety for the homeowner in the event first barrier plate 135 were to be completely detached from the face of garage door 100 and barrier plate 135 enters under garage door 100 path during time of closing operation (As shown in FIG. 7B). The combined height/projection of first barrier plate 135 while now resting on the threshold 103 (e.g. ground surface) may be approximately 0.5" in height. This is a height less the industry standard 0.75" installation height of garage door 100 bottom edge to threshold 103, providing a gap for an easily deformed, weather-stripping bulb 101, from the bottom edge of garage door 100 to the threshold 103. This industry recognized value of 0.75" installation height is to prevent or minimize the possibility of applying a crushing force to feet or hands and/or resulting in a jerk-force reaction due to sudden interference from any object or in this instance, first barrier plate 135 and similar embodiments being encountered by garage door 100 during time of closing operation. While remaining to be a successful deterrent that is both sufficiently hard and tough to thwart damage by pests. Barrier plate 135, due to its inherent designed-in flexibility from the bodies cross-section area moment of inertia "I" value, can easily be deformed/flattened by garage door 100 without damage to either. Garage door 100's automatic system obstruction sensor resistance force setting is greater than force required to deform second bent portion 141 without alarming said sensing system and promoting the un-tracking of garage door 100. This desirable embodiment feature prevents damage to either or all of barrier plate 135, garage door 100, garage door 100's operation mechanism and prevents injury to the operator themselves.

Figure 8A:
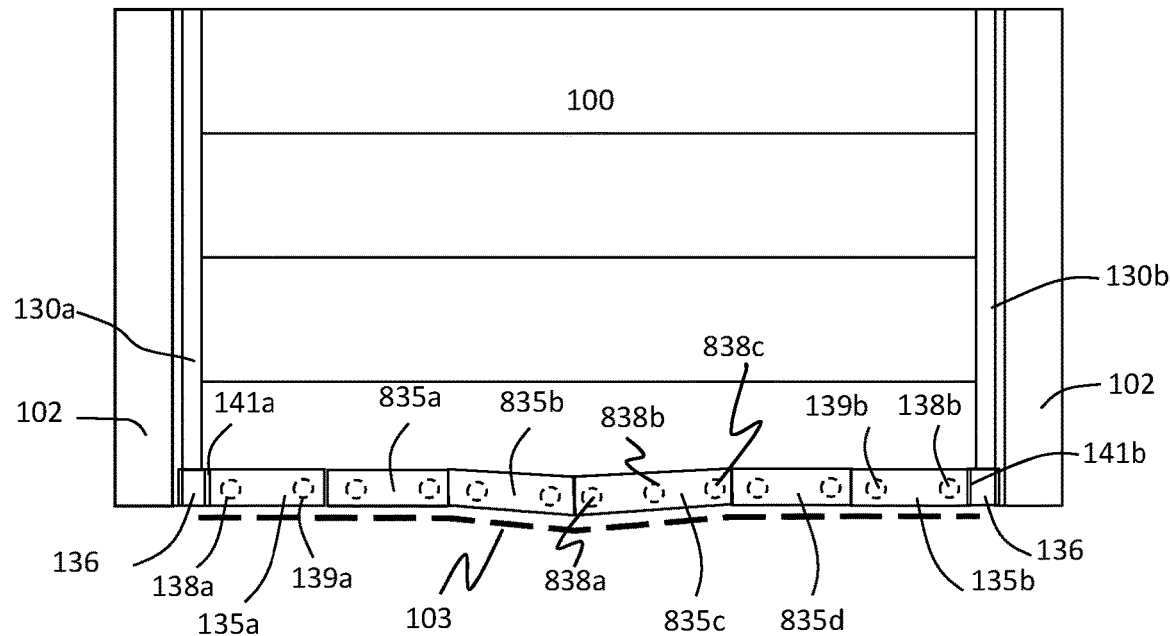
FIG. 8A shows a front view of FIG. 4A barriers and the relative positioning of the additional barriers attached magnetically as the door is fully closed.

FIG. 8A shows another embodiment for obstructing the distance across the bottom length of garage door 100. The embodiment shown in FIG. 8A utilizes a series of barrier plates 835*a*-835*d* in conjunction with barrier plate 135*a*) and 135*b*. Barrier plate 135*b* is placed opposite barrier plate 135*a* at the other side of garage door 100 and rotated 180 degrees to overlap weather stripping 130*b*. Barrier plates 835*a*-*d* are comprised of the same or similar material to barrier plate 135 including magnets 838*a*-*c*, which may be the same or similar to magnets 138 and 139. Barrier plates 835, however, do not comprise bent portion 141. They comprise flat portion 140, which can be varied depending on length and shape needs as required. This embodiment protects garage door 100 bottom edge weather-stripping bulb 101 for its entire length of garage door 100 and provides for gap closure. This embodiment is useful for obstructing pests where thresholds 103 have excessive gap variance. Gap variances may be due to an undesirable setting of material causing undulations or cracks or damage from the effects of stress over time, and/or not being a preferred flat surface. These combined effects can promote a multitude of differing threshold 103 features with rises-and-falls of varying lengths and at varying points along the bottom of garage door 100. Barrier plates 135 and/or 835 may be cut to a desired length and placed using the magnets 138, 139 and 838 respectively, along the bottom portion of garage door 100 spanning from door frame 102 on the right side of garage door 100 to door frame 102 located on the left side. FIG. 8A depicts barrier plates 835*b* and 835*c* trimmed to a threshold 103 section contour, such that the contour transcribed from threshold 103 is matched to barrier plates 835*b* and 835*c* and they obstruct the resulting gap. Alternatively, barrier plates 835*b* and 835*c* may be positioned at an angle relative to the bottom of garage door 100 and cut at the butting sides to the proper mitered angle to seal the gap.

Figure 8B:
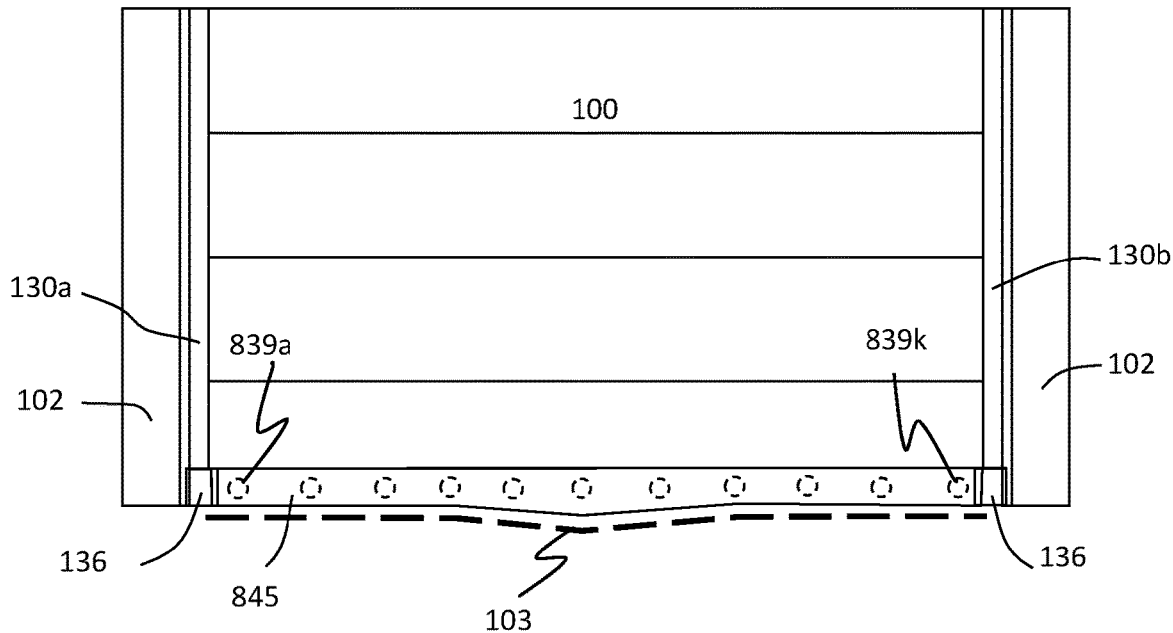
FIG. 8B shows a front view of FIG. 4A and the relative positioning of a barrier that extends along the length of the garage door and is constructed such that it accounts for threshold deformities when the door is fully closed.

FIG. 8B shows another embodiment utilizing a single barrier plate 845 comprised of similar material to barrier plate 135 and further comprised of similar portion 140 and the two magnets 138 and 139 (shown here as plurality of magnets 839*a*-*k*), and including two similar bent portions 141 (not shown), which cover sections 136 respectively. However, the length of portion 140 spans the entire bottom edge of garage door 100. The plurality of magnets 839*a*-*k* may be used to attach barrier plate. Barrier plate 845 may be cut to match the contour variance at locations along threshold 103 where necessary. For example, barrier plate 845 may be trimmed to a smaller width near the left and right door trims 102 respectively and maintain its originally manufactured width at the widest required location. This application protects garage door 100 bottom edge weather-stripping bulb 101 for its entire length and provides for uneven gap obstruction. This application lends itself to a more attractive appearing garage door 100 while gaps caused by threshold 103 having variances as described above.

In yet another embodiment (not shown), barrier plates 135, 835 and/or 835 may require no magnets, wherein the portion 140 comprises an entirely magnetic flexible, but durable, paintable material, which holds the respective barrier plate to the bottom of garage door 100 while still providing the safety aspects of preventing hooking or crushing.

In keeping with the versatility of the invention, desirable ease of use and installation of the aforementioned embodiments and related variations, door 100 may be of manufacturer's design steel material for direct adherence of magnets 138, 139, 838 and/or 839 or by using standard attachment hardware and methods or using a suitable exterior quality adhesive, the magnets may be attached to any non-magnetic conductive manufacturer's design door face material using standard attachment hardware and methods or using a suitable exterior quality adhesive. Also, the magnets may be attached to a steel garage door 100 face by magnetic force and attached to any of the barrier plates 135, 835 or 845 and similar variances, using standard attachment hardware and methods or using a suitable exterior quality adhesive. The aforementioned alternatives still provide the desirable performance.

While the preferred embodiments of the present invention have been illustrated in detail, it should be apparent that modifications and adaptations to those embodiments may occur to one skilled in the art without departing from the scope of the present invention.

What is claimed:

1. An apparatus for obstructing a bottom corner space formed between a garage door and a door frame and bottom spaces formed between the garage door and a threshold surface comprising:
   a first barrier plate comprising a first portion and a second portion, wherein the first portion is magnetically coupled to a bottom portion of the garage door;
   wherein the bottom portion of the garage door is adjacent to the threshold surface when the door is in a closed position;
   and wherein the second portion of the first barrier plate is adjacently coupled to a first distal end of the first portion at an angle;
   a second barrier plate comprising a third, fourth, and fifth portion, wherein the third portion is coupled to the fourth portion and the fourth portion is coupled to the fifth portion;
   wherein the fourth portion is attached to a bottom portion of the door frame and
   the third portion overlaps with a weather stripping coupled to the door frame; and wherein
   the second portion of the first barrier plate and the fifth portion of the second barrier plate overlap when the door is in the closed position to form a barrier between the bottom portion of the door frame and the bottom portion of the garage door; and
   wherein the first barrier plate is magnetically coupled to the bottom portion of the garage door by a first and a second magnet;
   wherein the first magnet is located near a first distal end of the first barrier plate and the second magnet is located near a second distal end of the first barrier plate; and
   wherein the second distal end is opposite from the first distal end such that the first barrier plate pivots relative to the first or second magnet to perform at least one of pivoting the first barrier plate when an external force is applied without decoupling from the bottom portion of the garage door and obstructing a bottom space formed between the garage door and the threshold surface.

* * * * *